United States Patent [19]

Bonello

[11] Patent Number: 4,636,096
[45] Date of Patent: Jan. 13, 1987

[54] AUTOLUBRICATING BEARING

[75] Inventor: Philippe Bonello, Grand-Saconnex, Switzerland

[73] Assignee: Sarcem S.A., Meyrin, Switzerland

[21] Appl. No.: 756,090

[22] Filed: Jul. 17, 1985

[30] Foreign Application Priority Data

Aug. 3, 1984 [CH] Switzerland ............ 03748/84

[51] Int. Cl.[4] ........................................... F16C 17/08
[52] U.S. Cl. .................................. 384/243; 384/425; 384/907.1
[58] Field of Search ............... 384/243, 425, 244, 245, 384/246, 297, 384

[56] References Cited

U.S. PATENT DOCUMENTS

| 1,950,867 | 3/1934 | Straumann | 384/246 |
| 2,203,411 | 6/1940 | Green | 384/246 |
| 3,020,104 | 2/1962 | Nichols | 384/246 |

FOREIGN PATENT DOCUMENTS 1113014  3/1956  France .
128272  10/1928  Switzerland .
329810  6/1958  Switzerland .
332553  10/1958  Switzerland .
7627/74  12/1975  Switzerland .

Primary Examiner—Lenard A. Footland
Attorney, Agent, or Firm—Young & Thompson

[57] ABSTRACT

A body of brass (1) provided with a central through passage (2) presenting two cylindrical surfaces (3,4) of different diameters. A disc of hard stone (10) is driven in the first cylindrical surface (3). A pierced steel ring (11) is driven in the second cylindrical surface. One of the annular faces (5) of this ring (11) is in contact with one of the faces of the disc of hard stone (10). A cylindrical part (12) of synthetic resin is fixed in the steel ring (11), this part (12) presenting an internal cylindrical surface having the shape of a diabolo the medial part of which (13) receives a pivot. The internal frontal face of the part (12) of synthetic resin is in contact with the face of the disc (10) of hard stone which itself is in contact with the steel ring (11).

4 Claims, 2 Drawing Figures

AUTOLUBRICATING BEARING

The present invention relates to an autolubricating bearing simultaneously constituting an end abutment which can be used in very special applications imposing extreme working conditions, a total lack of maintenance, a great solidity and a great longevity. These bearings are particularly intended to equip measuring apparatuses included in control panels of airplanes such as artificial horizons, altimeters and barometers and so on.

For these very particular applications, it is necessary to reduce the driving torque of the movable parts as much as possible, to ensure a good working in a range of temperature from −60° C. to +80° C., that the working characteristics be independent of the relative humidity of the environment in which the device works.

The bearings which are now used in this type of applications present generally contact surfaces which are provided with graphite so that during their storage before the mounting in the instruments and apparatus and during that assembly particular precautions have to be taken to prevent dust from being occluded on the sliding surfaces, which damages the working conditions. Further the graphite is sensible to the degree of humidity so that the characteristics, in particular the driving torque of the apparatus thus equipped vary as a function of the ambient humidity.

The present invention has the object to provide an autolubricating bearing avoiding the precited drawbacks and permitting a reduction of the driving torque, a greater durability, a total absence of maintenance, a perfect working in a range of temperature from −60° C. to +80° C. and which is insensible to humidity.

The autolubricating bearing according to the invention is characterized in that it comprises a brass body provided with a central through passage presenting a first cylindrical surface in which a hard natural or synthetic stone disc is driven, and a second cylindrical surface, of greater diameter than the first one, in which a steel ring is driven, which is provided with a central hole having a diameter less than that of the first cylindrical surface and one of the annular faces of which is in contact with one of the faces of the hard stone disc; by the fact that a cylindrical part of synthetic resin is fixed in the steel ring, this part presenting a median internal cylindrical surface intended to receive a pivot and two conical surfaces widening from that median cylindrical surface up to the frontal surfaces of that part defining thus a central void having in longitudinal cross section the general shape of a diabolo, and by the fact that the internal frontal face of the part of synthetic resin is in contact with the face of the hard stone disc which is itself in contact with the steel ring.

The attached drawing shows schematically and by way of example two embodiments of the autolubricating bearing according to the invention.

Figure 1:
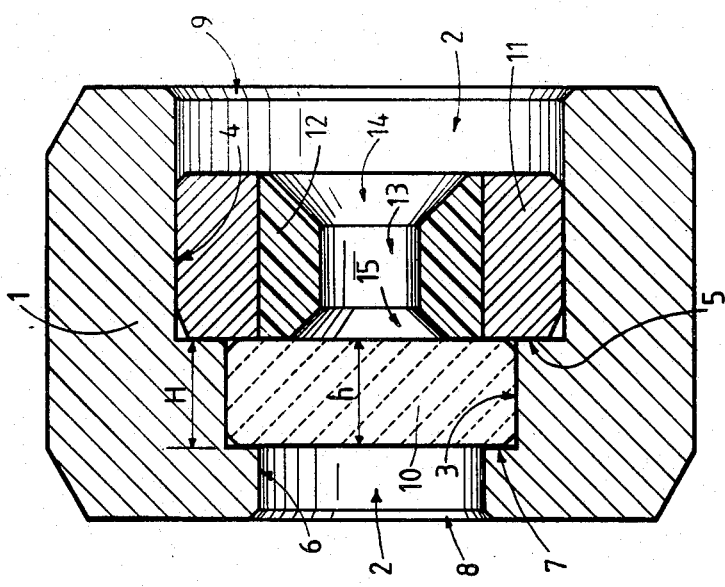
FIG. 1 is an axial cross section of a first embodiment of the bearing.

The autolubricating bearing shown on a greatly enlarged scale in FIG. 1 has in its actual size an external diameter of about 1 to 3 mm and a thickness of about 0.6 to 1.8 mm, that is to say that these bearings are of very small dimensions.

This bearing is intended to equip measuring instruments and apparatuses intended for aeronautics such as altimeters and barometers for example, which have to be insensible to aging, to humidity, to variations of temperature in a range of −60° C. to +80° C. and which require no maintenance, lubrication, cleaning or the like.

To obtain such a result the material used for the realization of the different parts of the bearing is naturally important, but it is also necessary to realize a combination of parts and to determine the shape of each of these parts so that the characteristics of the realized bearing be optimal.

The bearing shown in FIG. 1 comprises a body 1 having a generally cylindrical shape, the edges of which have been chamfered to facilitate its assembly in an apparatus or instrument which is generally made by insertion in a calibrated hole.

This body 1 has a central through passage 2, presenting a first cylindrical surface 3 and a second cylindrical surface 4, having a greater diameter defining thus a shoulder 5. A third cylindrical surface 6 of smaller diameter than the first one 3 defines a second shoulder 7. The ends of the central passage emerging on the frontal faces of the body 1 are chamfered at 8 respectively 9.

A disc of ruby 10, synthetic or natural, presents a diameter corresponding to that of the first cylindrical surface 3 in order to be fixed in the body 1 by driving or by friction in said cylindrical surface 3. The height h of this disc 10 is equal to the height H of the said cylindrical surface 3 so that when the ruby disc 10 is in service position, abutting against the shoulder 7, its other face will be located in the plane of the shoulder 5. The circular edges of the disc 10 are chamfered to facilitate its introduction into the body 1.

It is evident that this disc of ruby 10 could be in variants realized in an other synthetic or natural stones generally used for industrial bearings.

This disc 10 in hard stone is maintained in service position as shown by a steel ring 11 driven, fitted or fixed in the second cylindrical surface 4 of the body 1, which rests against the shoulder 5 and which thus enters into contact with the frontal face of the disc 10. The circular internal edges of this ring 11 are chamfered to facilitate its introduction into the body 1.

This steel ring 11 houses a part 12 made of a synthetic resin denominated "Hostaforme", made by the firm HOEGST AKTIENGESELLSCHAFT, FRANKFURT A/MAIN-HÖGST, with which it is fastened by any means, setting, driving in, gluing etc. The thickness of this part 12 is equal to that of the ring, it presents a central hole 13 of a diameter corresponding to that of a pivot having to cooperate with this bearing. This hole 13 is extended on either side by conical surfaces 14, 15 widening towards the frontal faces of the part 12. The hollow housing of this part 12 has thus in axial cross section the general shape of a diabolo.

This synthetic resin "Hostaform" is autolubricating and does not necessitate any graphite or any other external lubrication.

Tests made with these bearings have proved that they are very simple to assemble, do not necessitate any lubricating operation, that they need no maintenance, that they correspond to the working conditions required and enumerated above and that the driving torque is reduced by about 50% with respect to a normal bearing and that on top of all this driving torque diminishes after a certain time of utilization without introducing any play or other negative consequences. This bearing has thus mechanical characteristics which improve as a function of its duration of use.

Figure 2:
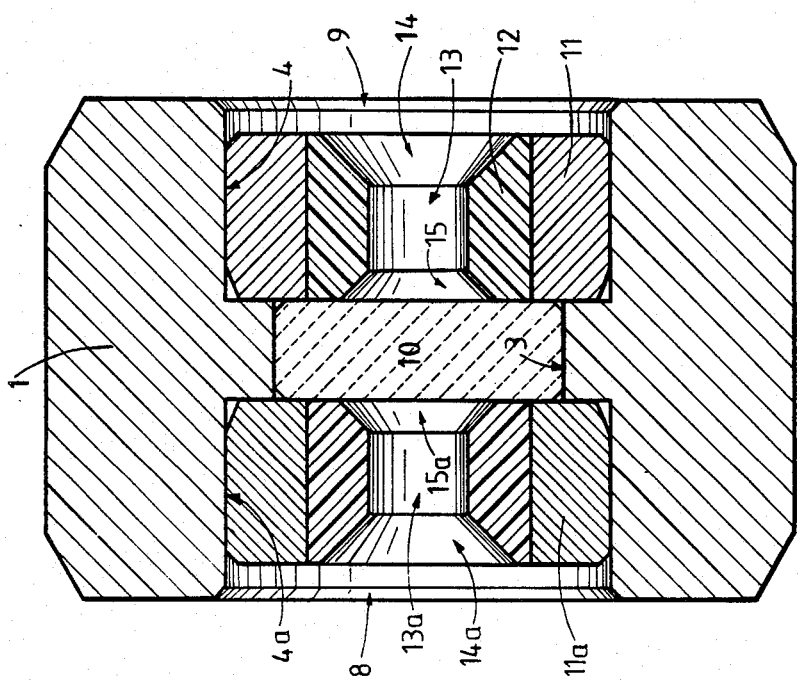
FIG. 2 is an axial cross section of a second embodiment of the bearing.

The second embodiment of the bearing shown in FIG. 2 is a double bearing in which the shoulder 7 against which the disc 10 rests is replaced by a second ring 11a driven into a cylindrical surface 4a which the body 1a presents and housing a part 12a. Thus, the same disc of hard stone 10 is used as abutment for inline bearings cooperating with two distinct coaxial pivots. The other elements of this bearing are the same as those described in reference to FIG. 1.

I claim:

1. Autolubricating bearing, characterized by the fact that it comprises a body provided with a central through passage presenting a first cylindrical surface in which a disc of natural or synthetic hard stone is driven and a second cylindrical surface, of greater diameter than the first one, in which a steel ring is driven which is provided with a central hole having a diameter less than that of the first cylindrical surface and one of the annular faces of which is in contact with one of the faces of the disc of hard stone; by the fact that a cylindrical part of synthetic resin is fixed in the steel ring, this part presenting an internal medial cylindrical surface adapted to receive a pivot and two conical surfaces widening from said medial cylindrical surface towards the frontal surfaces of this part and by the fact that the frontal internal face of the part of synthetic resin is in contact with the face of the hard stone disc which is itself in contact with the steel ring.

2. Bearing according to claim 1, characterized by the fact that the thickness of the hard stone disc is equal to the height of the first cylindrical surface and by the fact that the other frontal face of this disc bears against a shoulder of the body.

3. Bearing according to claim 1, characterized by the fact that the thickness of the hard stone disc is equal to the height of the first cylindrical surface and by the fact that the other frontal face of this disc bears against the face of a second steel ring driven into another cylindrical surface of the body and housing a part identical to said part contained in the first steel ring.

4. Bearing according to claim 1 characterized by the fact that the hard stone disc is of synthetic or natural ruby.

* * * * *